United States Patent Office 2,739,070
Patented Mar. 20, 1956

2,739,070

CELLULOSE MIXED ESTER FILM-FORMING COMPOSITION AND A FILM MADE THEREFROM

Charles R. Fordyce and Bruce E. Gramkee, Rochester, N. Y., assignors to Eastman Kodak Company, Rochester, N. Y., a corporation of New Jersey No Drawing. Application January 9, 1953,
Serial No. 330,590

12 Claims. (Cl. 106—189)

This invention concerns an improved solution for casting photographic film support of cellulose acetate propionate or cellulose acetate butyrate, and to the film cast therefrom.

The use of a cellulose acetate propionate of approximately 13 to 15 percent propionyl and 29 to 31 percent acetyl has been particularly successful as an amateur motion-picture film base when cast from a solution of propylene chloride and methyl alcohol. This film base has specific properties which so far do not appear to be possessed by the cellulose acetate film base of 42.5% to 44% acetyl content as described in U. S. Patent No. 2,492,977.

A film base for use as an amateur motion-picture film must not only have a practical wear life and physical appearance, but must also satisfy many requirements in its process of manufacture.

The problem of the quality of the perforation cut, and the rigidity and flexibility of the film have been of paramount importance in the making of amateur motion-picture film. Perforation quality is important because ragged cuts produce loose particles of emulsion or backing on the film which can be a source of dirt. The rigidity and flexibility are related to the behavior of the film in the camera, especially those which use magazine loading. Clock spring effects or permanent deformation of a few frames of the film which can take place in a partially used magazine may result in failure of the magazine operation.

The cellulose acetate propionate film described above cast from a solvent mixture of propylene chloride and methyl alcohol, does not have these objections but does suffer in comparison with film base made from the other cellulose esters in that its casting speed is slow. This casting solution required an air curing time of approximately 8 to 10 minutes before the support could be stripped from the casting surface. An example of its physical properties will serve as a basis of a later comparison with an improved formula:

|  | Length | Width |
| --- | --- | --- |
| Waterbath Shrinkage (%) | .39 | .60 |
| Swell and Shrink Amplitude (%) | 1.16 | 1.31 |
| Tensile Strength, #/sq. in | 11,400 | 10,000 |
| Schopper Folds | 14 | 13 |
| Elmendorf Tear (grams) | 42 | 49 |
| Residual solvent content, percent | 4.5 | |

We have found that we can improve the coating formulation of cellulose acetate propionate or cellulose acetate butyrate and also the film base by the use of a new solvent composition which will retain the good properties and at the same time improve the base with additional properties of higher physical strength, lower shrinkage, and low residual solvent content. A further advantage of the formula is to improve the casting speed so as to make the composition more attractive commercially.

It is an object of the invention to provide such an improved casting formulation. Another object is to provide film of cellulose acetate propionate or cellulose acetate butyrate having the improved properties set forth above.

The cellulose esters which may be used in this process are either cellulose acetate propionates of 29% to 31% acetyl content, and 13% to 15% propionyl content, or cellulose acetate butyrates of 30% to 32% acetyl content and 12% to 14% butyryl content. The solvent compositions, which have been found to be useful, are those within the range of 80% to 90% methylene chloride, 5% to 15% butyl alcohol, and 3% to 10% methyl alcohol. The total alcohol content of the solution should be not less than 10% and not more than 20%. (All compositions are parts by weight.)

The following examples illustrate the invention but the invention is not to be considered as limited thereto, as the above definition of the useful compositions sets forth the critical ranges:

*Example I*

A film casting composition consisting of 100 parts by weight of a cellulose acetate propionate of 14% propionyl and 30% acetyl was dissolved in a mixture of 434 parts of methylene chloride, 25 parts of methyl alcohol and 51 parts of n-butyl alcohol to which was added, after the ester was in complete solution, 8 parts of triphenyl phosphate. This mixture was processed in the usual manner and then cast on a polished cylinder having a temperature of 80° F. The coating composition was partially air cured and the support stripped from the surface in 4.6 minutes. It was then cured in appropriate air sections where dye tinting and surface applications were made. The resulting film base was .0055″ thick and had the following physical properties:

|  | Length | Width |
| --- | --- | --- |
| Waterbath Shrinkage (percent) | .15 | .07 |
| Swell and Shrink Amplitude (percent) | .66 | .93 |
| Yield Point, #/sq. in | 11,700 | 9,800 |
| Tensile Strength, #/sq. in | 14,300 | 12,600 |
| Schopper Folds | 15 | 17 |
| Elmendorf Tear (grams) | 42 | 54 |
| Residual solvent content, percent | 3.1 | |

*Example II*

A film casting composition consisting of 100 parts by weight of a cellulose acetate propionate of 15% propionyl and 29% acetyl was dissolved in a mixture of 425 parts of methylene chloride, 50 parts of methyl alcohol and 25 parts of n-butyl alcohol to which was added, after the ester was in complete solution, 8 parts of triphenyl phosphate. This mixture was processed in the usual manner and then cast on a polished cylinder having a temperature of 75° F. The coating composition was partially air cured and the support stripped from the surface in 4.6 minutes. It was then cured in air sections where dyes and various surface applications were made. The resulting film base was .0055″ thick and had the following physical properties:

|  | Length | Width |
| --- | --- | --- |
| Waterbath Shrinkage (percent) | .35 | .10 |
| Swell and Shrink Amplitude (percent) | .75 | .94 |
| Yield Point, #/sq. in | 10,300 | 9,200 |
| Tensile Strength, #/sq. in | 13,400 | 11,900 |
| Schopper Folds | 18 | 19 |
| Elmendorf Tear (grams) | 46 | 48 |
| Residual Solvent Content, percent | 3.2 | |

*Example III*

A film casting composition consisting of 100 parts by weight of a cellulose acetate propionate of 14% propionyl and 29% acetyl was dissolved in a mixture of 364 parts of methylene chloride, 21.5 parts of methyl alcohol and 43 parts of n-butyl alcohol to which was added, after the ester was in complete solution, 8 parts of triphenyl phosphate. This mixture was processed in the usual manner and then cast on a polished cylinder having a temperature of 75° F. The coating composition was partially air cured and the support stripped from the surface in 3.8 minutes. It was then cured in appropriate air sections. The resulting film base was .0055″ thick and had the following physical properties:

|  | Length | Width |
|---|---|---|
| Waterbath Shrinkage (percent) | .25 | .19 |
| Swell and Shrink Amplitude (percent) | .88 | 1.12 |
| Yield Point, #/sq. in | 9,500 | 8900 |
| Tensile Strength, #/sq. in | 12,100 | 10,400 |
| Schopper Folds | 10 | 10 |
| Elmendorf Tear | 39 | 45 |
| Residual Solvent Content, percent | 2.2 | |

These physical properties of the above examples may be compared with those of the original film base cast from propylene chloride and methyl alcohol as described above. It will be noted that the films according to the invention show lower waterbath shrinkage and swell and shrink amplitude, higher tensile strength and lower residual solvent content. The lower shrinkage base is obtained by reason that, in the original film base, propylene chloride is the residual solvent while with the improved formula, butyl alcohol is the residual solvent. We have found that the alcohols diffuse through the base more readily than propylene chloride. The lower shrinkage base is important to obtain a film with less distortions and to maintain size in certain film duplicating and printing processes.

It can also be seen that the improved formula can be cast from two to three times as fast as the original formula. This is particularly important in the most efficient utilization of casting machinery which is quite expensive.

*Example IV*

In an operation similar to that described above, 100 parts of a cellulose acetate butyrate of 31.1% acetyl and 12.8% butyryl content was dissolved in 445 parts by weight of a solvent mixture of 85% methylene chloride, 10% butyl alcohol, and 5% methyl alcohol, and 8 parts of triphenyl phosphate was added as plasticizer.

The solution, when cast to produce photographic film support of .0055″ thickness, could be removed from the casting surface (temperature 80° F.) after 4.4 minutes. Physical properties of the product were similar to those obtained from cellulose acetate propionate.

Casting surface temperatures of 70° to 85° F. comprise the practical operating range for casting films or sheets from the solutions taught herein.

Various types of dyes or other coloring agents either singly or in combination may be incorporated in films formed in accordance with the present invention. These agents may be fluorescent and may include, among others, the following: Eastone Red R, Eastone Red B, Nigrosine C. I. 864, Grasol Fast Black G, a coumarin dye such as 7-diethylamino-4-methylcoumarin, Sudan Black G, anthracene, Interchemical Acetate Scarlet B, rhodamine, fluorene, chrysene, naphthacene, 2,2′-dihydroxy-benzalazine, methyl umbelliphorone, anthranilic acid, ethyl anthranilate, 3-dimethylamino-acriline, 2-phenyl-5-amino benzoxazole, and others.

These agents may be added to the solution of cellulose esters and the composition agitated until homogeneity is accomplished. Where the dyes are solids, they can be added to the cellulose ester solution as such or in solution in the solvent mixture used for dissolving the cellulose ester. They may also be added as a coating on the film, as by immersing the cellulose ester film in a solution of the coloring agent in a solvent having no dissolving power for the cellulose ester. In another manner of applying these agents, they may be mixed with the plasticizer before it is added to the dissolved cellulose ester.

In the above description triphenyl phosphate has been referred to as the plasticizer. This type of plasticizer is preferred because of its noninflammable nature. However, other plasticizers suitable for films use such as tricresyl phosphate, diethyl phthalate, dibutyl phthalate and tripropionin may be used in place of, or in conjunction with the triphenyl phosphate.

We claim:

1. As a new composition of matter, a cellulose mixed ester film-forming composition capable of being rapidly cast in the form of film particularly useful as motion picture film base, comprising a cellulose derivative selected from the group consisting of cellulose acetate propionates of 29–31 per cent acetyl content and 13–15 per cent propionyl content, and cellulose acetate butyrates of 30–32 per cent acetyl content and 12–14 per cent butyryl content, in solution in a solvent mixture composed of the following components present in approximately the following percentages by weight based on the weight of the solvent mixture:

| | Percent |
|---|---|
| Methylene chloride | 80–90 |
| n-Butyl alcohol | 5–15 |
| Methyl alcohol | 3–10 |

2. A new composition of matter according to claim 1, the cellulose ester being present in the proportion of about 100 parts of ester to about 428–510 parts of solvent mixture.

3. As a new composition of matter, a film-forming composition according to claim 1, wherein the cellulose ester is about 100 parts of a cellulose acetate propionate of about 14 per cent propionyl and 30 per cent acetyl, and the solvent mixture has approximately the following composition:

| | Parts |
|---|---|
| Methylene chloride | 434 |
| n-Butyl alcohol | 51 |
| Methyl alcohol | 25 |

4. As a new composition of matter, a film-forming composition according to claim 1, wherein the cellulose ester is about 100 parts of a cellulose acetate propionate of about 15 per cent propionyl and 29 per cent acetyl, and the solvent mixture has approximately the following composition:

| | Parts |
|---|---|
| Methylene chloride | 425 |
| n-Butyl alcohol | 25 |
| Methyl alcohol | 50 |

5. As a new composition of matter, a film-forming composition according to claim 1, wherein the cellulose ester is about 100 parts of a cellulose acetate propionate of about 14 per cent propionyl and 29 per cent acetyl, and the solvent mixture has approximately the following composition:

| | Parts |
|---|---|
| Methylene chloride | 364 |
| n-Butyl alcohol | 43 |
| Methyl alcohol | 21.5 |

6. As a new composition of matter, a film-forming composition according to claim 1, wherein the cellulose ester is about 100 parts of a cellulose acetate butyrate of about 31.1 per cent acetyl and 12.8 per cent butyryl content, and the solvent mixture has approximately the following composition:

| | Percent |
|---|---|
| Methylene chloride | 85 |
| n-Butyl alcohol | 10 |
| Methyl alcohol | 5 |

7. A cellulose mixed ester film particularly useful as motion picture film base, made by casting a plasticized solution of a cellulose ester selected from the group consisting of cellulose acetate propionates of 29–31 per cent acetyl content and 13–15 per cent propionyl content, and cellulose acetate butyrates of 30–32 per cent acetyl content and 12–14 per cent butyryl content, in a solvent mixture having the following approximate composition:

| | Percent |
|---|---|
| Methylene chloride | 80–90 |
| n-Butyl alcohol | 5–15 |
| Methyl alcohol | 3–10 |

8. A cellulose mixed ester film according to claim 7, wherein the plasticized solution contains about 100 parts of the ester to about 428–510 parts of solvent mixture.

9. A cellulose acetate propionate film particularly useful as motion picture film base, made by casting a plasticized solution of about 100 parts of a cellulose acetate propionate of about 14 per cent propionyl and 30 per cent acetyl in a solvent mixture having the following approximate composition:

| | Parts |
|---|---|
| Methylene chloride | 434 |
| n-Butyl alcohol | 51 |
| Methyl alcohol | 25 |

10. A cellulose acetate propionate film particularly useful as motion picture film base, made by casting a plasticized solution of about 100 parts of a cellulose acetate propionate of about 15 per cent propionyl and 29 per cent acetyl in a solvent mixture having the following approximate composition:

| | Parts |
|---|---|
| Methylene chloride | 425 |
| n-Butyl alcohol | 25 |
| Methyl alcohol | 50 |

11. A cellulose acetate propionate film particularly useful as motion picture film base, made by casting a plasticized solution of about 100 parts of a cellulose acetate propionate of about 14 per cent propionyl and 29 per cent acetyl in a solvent mixture having the following approximate composition:

| | Parts |
|---|---|
| Methylene chloride | 364 |
| n-Butyl alcohol | 43 |
| Methyl alcohol | 21.5 |

12. A cellulose acetate butyrate film particularly useful as motion picture film base, made by casting a plasticized solution of about 100 parts of a cellulose acetate butyrate of about 31.1 per cent acetyl and 12.8 per cent butyryl in a solvent mixture having the following approximate composition:

| | Percent |
|---|---|
| Methylene chloride | 85 |
| n-Butyl alcohol | 10 |
| Methyl alcohol | 5 |

References Cited in the file of this patent

UNITED STATES PATENTS

| 1,960,185 | Malm I | May 27, 1934 |
| 2,189,590 | Malm II | Feb. 6, 1940 |
| 2,319,052 | Fordyce et al. | May 11, 1943 |
| 2,336,310 | Spence et al. | Dec. 7, 1943 |
| 2,367,503 | Hunter et al. | Jan. 16, 1945 |